(12) United States Patent
Kawaguchi

(10) Patent No.: US 10,303,096 B1
(45) Date of Patent: May 28, 2019

(54) IMAGE FORMING APPARATUS

(71) Applicant: TOSHIBA TEC KABUSHIKI KAISHA, Tokyo (JP)

(72) Inventor: Takahiro Kawaguchi, Mishima Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/059,470

(22) Filed: Aug. 9, 2018

(30) Foreign Application Priority Data

Jan. 25, 2018 (JP) .................................. 2018-010455

(51) Int. Cl.
| | |
|---|---|
| *G03G 13/20* | (2006.01) |
| *G03G 15/20* | (2006.01) |
| *G03G 15/01* | (2006.01) |
| *H04N 1/00* | (2006.01) |
| *H04N 1/32* | (2006.01) |
| *G06F 3/12* | (2006.01) |
| *G06K 15/00* | (2006.01) |

(52) U.S. Cl.
CPC ......... *G03G 15/205* (2013.01); *G03G 15/011* (2013.01); *G03G 15/0121* (2013.01); *G03G 15/2064* (2013.01); *G06F 3/1222* (2013.01); *G06K 15/4095* (2013.01); *H04N 1/00344* (2013.01); *H04N 1/32133* (2013.01); *H04N 2201/3205* (2013.01)

(58) Field of Classification Search
CPC .. G03G 15/0121; G03G 15/2003; G03G 9/09; G03G 9/0928; H04N 2201/3205
USPC ........ 358/1.9, 1.13, 1.18; 399/53, 67, 98, 99
See application file for complete search history.

(56) References Cited

U.S. PATENT DOCUMENTS

| | | | |
|---|---|---|---|
| 9,213,286 B1 * | 12/2015 | Ogasawara | ........ G03G 15/0189 |
| 9,582,228 B2 | 2/2017 | Hashidume et al. | |
| 2010/0272449 A1 * | 10/2010 | Yoshida | ............. H04N 1/32133 399/2 |
| 2012/0327481 A1 * | 12/2012 | Yamauchi | ............... G06K 15/02 358/3.28 |

* cited by examiner

*Primary Examiner* — Jamares Q Washington
(74) *Attorney, Agent, or Firm* — Kim & Stewart LLP

(57) ABSTRACT

An image forming apparatus includes a controller to control a process of printing identification information along with an image on a medium. A first image forming section forms images using a non-decolorable material. A second image forming section forms images using a decolorable material. A fixing device performs fixes images to the medium at a first fixing temperature at or above a decoloring temperature of the decolorable material. When the identification information is to be visible, the controller controls the first image forming section to form the image and identification information, and the images are fixed to the medium at the first temperature. When the identification information printed on the medium is to be invisible, the first image forming section forms the first image, the second image forming section forms the identification information, and the fixing device fixes the images at the first temperature.

20 Claims, 5 Drawing Sheets

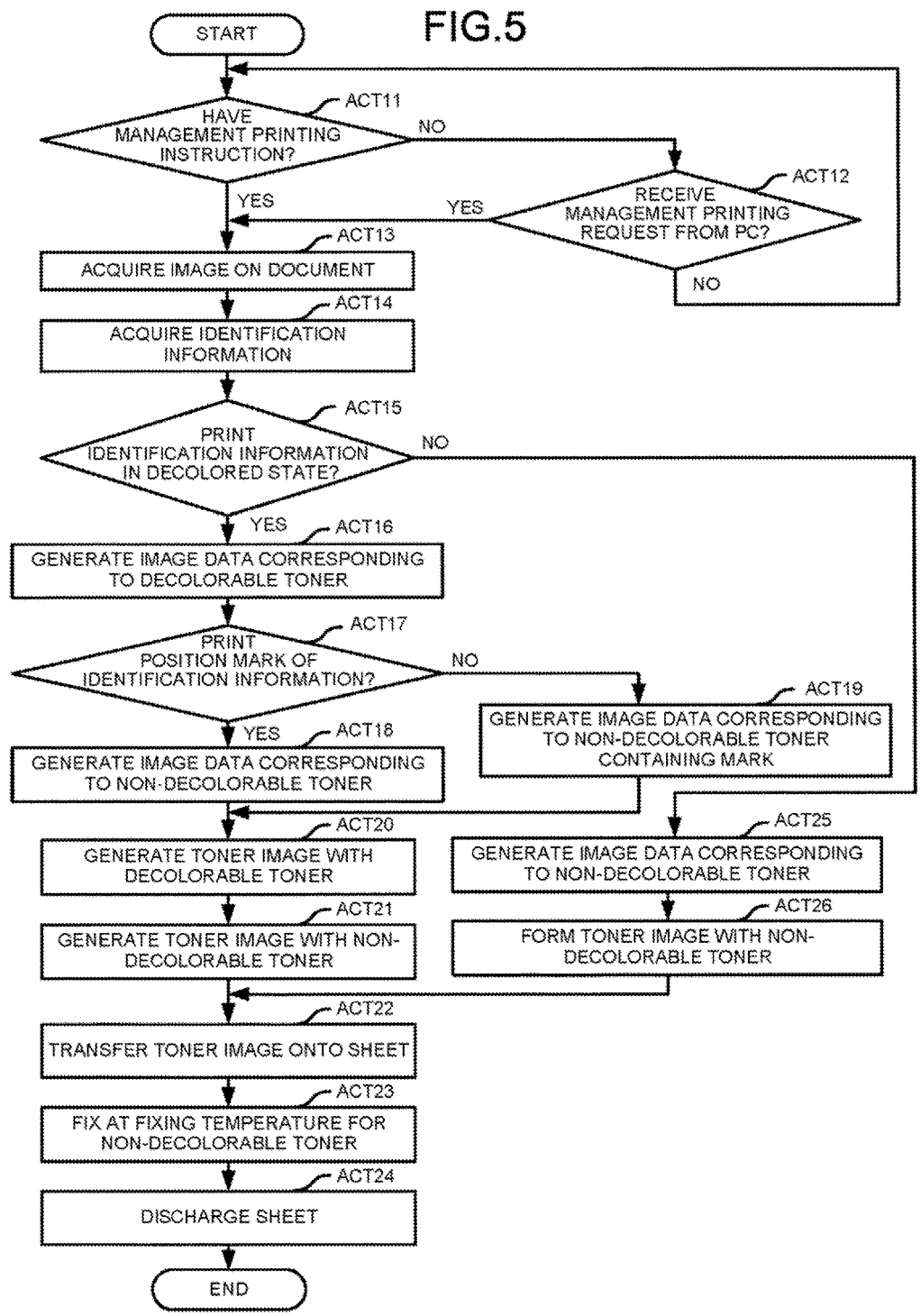

IMAGE FORMING APPARATUS

CROSS-REFERENCE TO RELATED APPLICATION

This application is based upon and claims the benefit of priority from Japanese Patent Application No. 2018-010455, filed Jan. 25, 2018, the entire contents of which are incorporated herein by reference.

FIELD

Embodiments described herein relate generally to an image forming apparatus.

BACKGROUND

A known image forming apparatus forms an image with a decolorable toner that can be decolored by heat or a non-decolorable toner that cannot be decolored. Such an image forming apparatus generally fixes toner images to sheets at a low fixing temperature below the temperature at which the decolorable toner is not decolored when the image is printed with the decolorable toner since the fixing temperature for the decolorable toner and the fixing temperature for the non-decolorable toner are different. If the fixing process is performed on the image formed with the decolorable toner at a fixing temperature for the non-decolorable toner, there is a possibility that the image formed with the decolorable toner is decolored and becomes invisible. For this reason, the conventional image forming apparatus is designed to select either one of the decolorable toner and the non-decolorable toner having different fixing temperature to execute printing. There is a problem that the conventional image forming apparatus cannot print both the image with the decolorable toner and the image with the non-decolorable toner at the same time.

DESCRIPTION OF THE DRAWINGS

FIG. 5 is a flowchart of a printing process in the management printing mode by the image forming apparatus according to the embodiment.

DETAILED DESCRIPTION

In accordance with an embodiment, an image forming apparatus comprises: a controller configured to control a image forming process to print identification information along with a first image on a medium according to an operation selection; a first image forming section for forming images on the medium using a non-decolorable image forming material; a second image forming section for forming images on the medium using a decolorable image forming material; and a fixing device configured to perform a fixing operation to fix images to the medium at a first fixing temperature that is at or above a decoloring temperature of the decolorable image forming material. When the operation selection indicates the identification information printed on the medium is to be visible, the controller controls the first image forming section to form the first image and the identification information on the medium and the fixing device to fix the images to the medium at the first temperature. When the operation selection indicates the identification information printed on the medium is to be invisible, the controller controls the first image forming section to form the first image on the medium, the second image forming section to form the identification information on the medium, and the fixing device to fix the images to the medium at the first temperature.

Hereinafter, example embodiments will be described with reference to the accompanying drawings.

Figure 1:
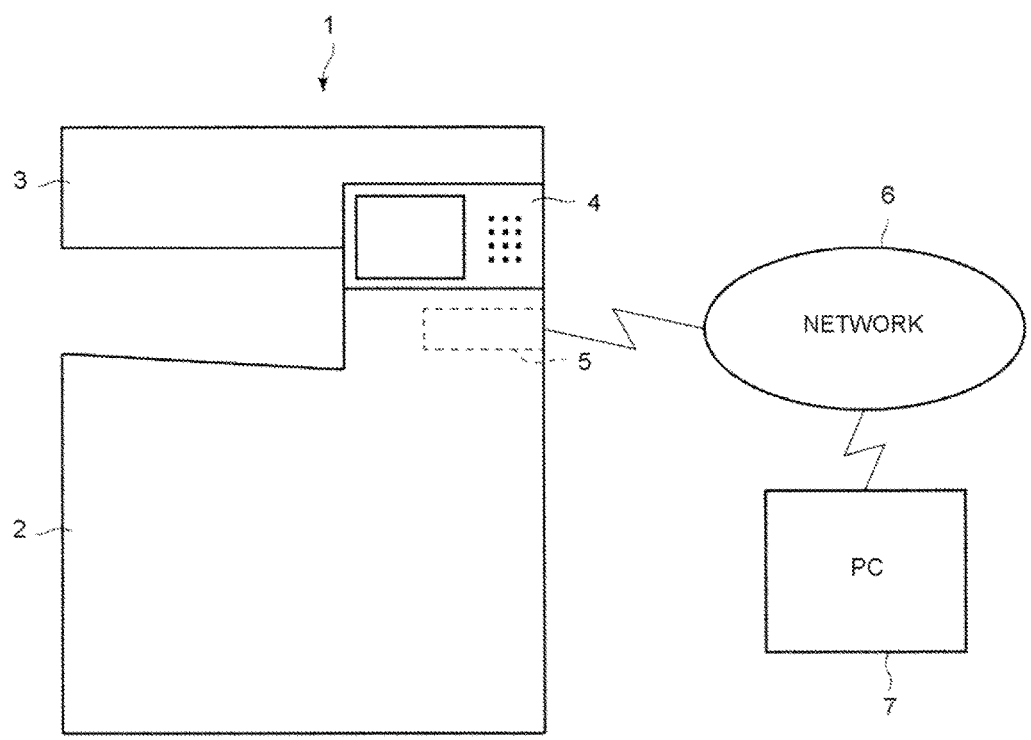
FIG. 1 is a diagram illustrating an example of a configuration of an image forming apparatus according to an embodiment.

FIG. 1 is a diagram illustrating a configuration of a Multi-Function Peripheral (MFP) 1, which is an example of an image forming apparatus according to the embodiment.

The MFP 1 is a multifunction peripheral having a printer 2, a scanner 3, an operation panel 4, a system controller 5, and the like. The printer 2, the scanner 3 and the operation panel 4 operate under the control of the system controller 5. The MFP 1 is capable of communicating with a PC 7, or other external device, via a network 6.

The printer 2 is capable of forming an image with a decolorable toner and an image with a non-decolorable toner. The decolorable toner is decolored when heated. For example, the decolorable toner is an initially blue color toner that can be decolored (become not readily perceptible as blue or otherwise) upon heating. The non-decolorable toner is a toner whose color does not substantially change due to the heat. For example, the non-decolorable toner may be a toner for forming a monochrome image such as black toner, or colored toners such as those used for forming conventional color images, such as four color toner images comprised of yellow, magenta, cyan, black toners.

The scanner 3 is a reading device that reads an image on a document. The scanner 3 reads the image on a document surface placed on a document table. The scanner 3 may include an ADF (Automatic Document Feeder) for conveying a document, and may read a document conveyed by the ADF rather than manually placed on the document panel by user.

The operation panel 4 is a user interface. The operation panel 4 includes a display section for displaying guidance and an operation input section through which a user inputs operational instructions or the like. For example, the operation panel 4 has various buttons and/or a display device attached to a touch panel for receiving user input(s).

The system controller 5 executes various processes as processor executing various software programs or the like. For example, the system controller 5 is connected to each section in the MFP 1 via an internal interface and controls each section in the MFP 1. The system controller 5 also has a function of processing image data. The system controller 5 also has or is connected to an interface for communicating with a PC 7 via the network 6.

The MFP 1 may be connected to devices such as a finisher (also referred to as post-processing apparatus in some contexts) for finishing a printed sheet (e.g., stapling or folding) and a fax unit for sending and receiving faxes. The present embodiment can be applied to any device type as long such device type can selectively print a decolorable image and a non-decolorable image, and thus the present embodiment may be applied to an image forming apparatus which lacks a scanner 3 or other aspects not necessarily required for provision of dual-type (decolorable/non-decolorable) printed images.

Figure 2:
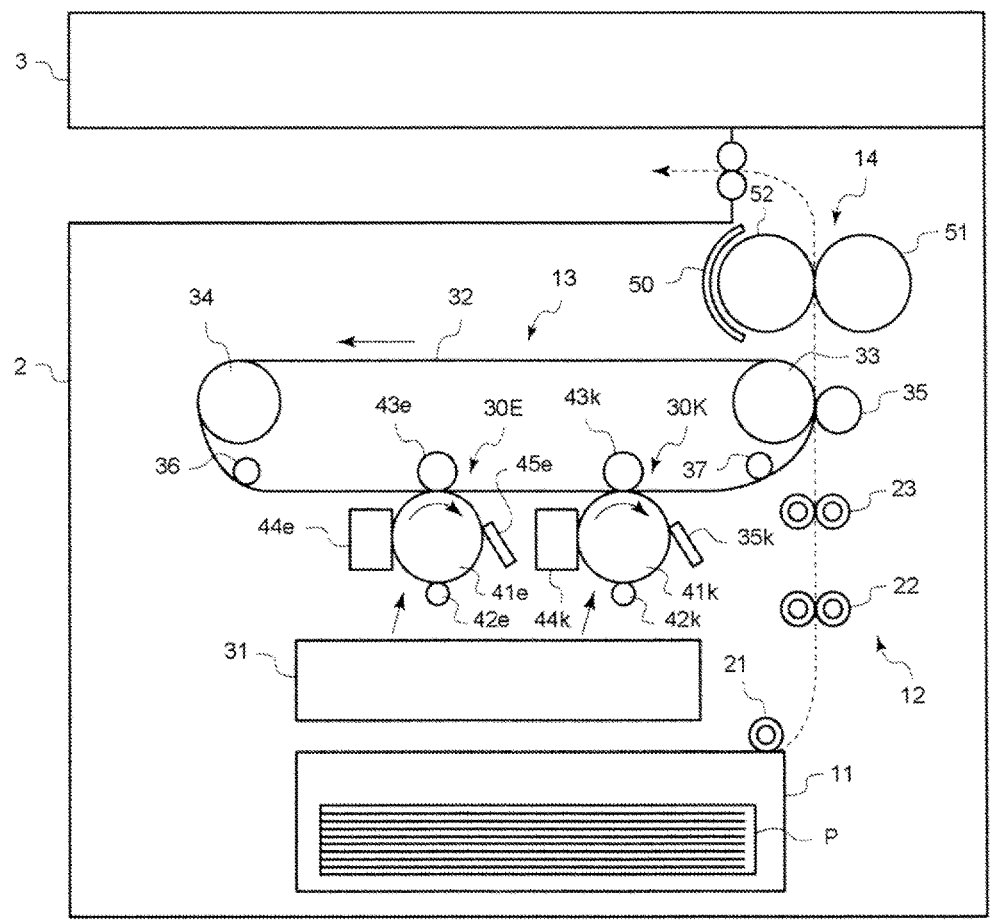
FIG. 2 is a cross-sectional view illustrating an example of a configuration of the image forming apparatus according to the embodiment.

FIG. 2 is a cross-sectional view illustrating an example of a configuration of hardware of the printer 2 in the MFP 1.

As shown in FIG. 2, the printer 2 includes a sheet feed cassette 11, a conveyance system 12, an image forming unit 13, a fixing device 14 and a system controller 5.

The sheet feed cassette 11 is provided detachably in a housing of the MFP 1. The sheet feed cassette 11 accommodates a sheet, or other image receiving medium, on which an image can be formed/printed.

The conveyance system 12 conveys a sheet supplied from the sheet feed cassette 11. The conveyance system 12 has a pickup roller 21, a conveyance roller 22, a registration roller 23 and a sheet discharge roller 24. The pickup roller 21, the conveyance roller 22, the registration roller 23, and the sheet discharge roller 24 are each driven by a motor or the like under the control of the system controller 5.

The pickup roller 21 picks up sheets one by one from the sheet feed cassette 11. The conveyance roller 22 conveys each sheet picked by the pickup roller 21 towards the registration roller 23. The registration roller 23 conveys the sheet to a secondary transfer position that is between a transfer belt 32 and a secondary transfer roller 35. For example, the sheet is temporarily stopped just in front of the registration roller 23 and then sent to the secondary transfer position in accordance with a timing at which the toner image on the transfer belt 32 moves. The sheet passed through the secondary transfer position is then supplied to the fixing device 14.

The fixing device 14 fixes the toner image to the sheet. The fixing device 14 has a pressure roller 51 and a fixing belt 52. The fixing device 14 is controlled by the system controller 5. For example, the temperature of the fixing belt 52 is controlled to reach a set point set by the system controller 5. The fixing device 14 applies heat and pressure to the toner image on the sheet as the sheet passes through a nip part (also referred to as a fixing position) between the fixing belt 52 and the pressure belt 51 to fix the toner image on the sheet. The fixing belt 52 and the pressure roller 51 rotate to convey the sheet passing through the nip part while heating and pressing the sheet. After the fixing process in the fixing device 14, the sheet is discharged to a sheet discharge section by the sheet discharge roller 24. The fixing device 14 also includes a sensor for detecting the temperature.

The image forming unit 13 includes an image forming section 30E, an image forming section 30K), an exposure device 31, a transfer belt 32, a driving roller 33, a driven roller 34, a secondary transfer roller 35, tension rollers 36 and 37, and the like.

An image forming section 30 includes the image forming section 30E and the image forming section 30K. Thus an image forming section 30 includes a first image forming section which forms an image with a decolorable toner (e.g., image forming section 30E) and a second image forming section which forms an image with a non-decolorable toner (e.g., image forming section 30K. The image forming section 30E forms an image (a toner image) with the decolorable toner. The image forming section 30E transfers the toner image formed with the decolorable toner onto the transfer belt 32. The image forming section 30K forms an image (a toner image) with the non-decolorable toner. The image forming section 30K transfers the toner image formed with the non-decolorable toner onto the transfer belt 32.

In the present embodiment, it is assumed that the image forming section 30K forms an image with black toner that is a the non-decolorable toner. However, the image forming section 30 may include three or more different image forming sections. For example, an image forming section for each of color used in printing standard color images with the non-decolorable toner may be provided.

The exposure device 31 irradiates a surface of photoconductive drums 41e, 41k in the image forming sections 30E and 30K with a laser beam. The exposure device 31 includes a light emitting section for emitting laser beam and an optical system such as a polygonal mirror for guiding the laser beam to the surface of the photoconductive drums. The system controller 5 controls the light emitting section and the optical system according to the image data used for printing, and in this way, the exposure device 31 forms an electrostatic latent image on the surface of the photoconductive drums 41e, 41k.

The transfer belt 32 is an intermediate transfer member onto which the images formed by the image forming sections 30E and 30K are transferred. The transfer belt 32 is wound around the driving roller 33, the driven roller 34, and the tension rollers 36 and 37. The transfer belt 32 rotates in a direction indicated by an arrow in FIG. 2 by rotation of the driving roller 33. The toner image formed by each of the image forming sections 30E and 30K is transferred onto the transfer belt 32 at a transfer position, referred to as a primary transfer position, for each of the image forming sections 30E and 30K. The driving roller 33 and the secondary transfer roller 35 are provided facing each other to form the secondary transfer position.

The image forming sections 30E, 30K respectively include a photoconductive drum 41e, 41k, a charging device 42e, 42k, a primary transfer roller 43e, 43k, a developing device 44e, 44k, and a cleaner 45e, 45k. In the vicinity of each photoconductive drum (41e, 41k), a charging device (42e, 42k), a developing device (44e, 44k), and a cleaner (45e, 45k) are arranged. The photoconductive drums rotate with the movement of the transfer belt 32. The respective charging devices charge the surface of the respective photoconductive drum to a predetermined potential. The surface of the photoconductive drum is then irradiated with a laser beam from the exposure device 31. As a result, an electrostatic latent image is formed on the surface of the photoconductive drum.

The each developing device 44e, 44k supplies a developer composed of a toner and a carrier to the electrostatic latent image formed on the respective photoconductive drum 41e, 41k. For example, the developing device 44e forms a toner image, corresponding to the electrostatic latent image already formed on the photoconductive drum 41e, using a developer composed of a decolorable toner and a carrier. The decolorable toner is, for example, a blue (E) color toner mainly composed of a leuco dye. The decolorable toner is decolored at a temperature (a decoloring temperature) higher than a fixing temperature used for fixing images formed with the decolorable toner.

The developing device 44k forms a toner image, corresponding to the electrostatic latent image already formed on the photoconductive drum 41k, using a developer composed of a non-decolorable toner and a carrier. The color of the non-decolorable toner does not substantially change with the temperature. For example, the non-decolorable toner is a black (K) toner mainly comprising black pigment(s).

The primary transfer rollers 43e, 43k are arranged to face the respective photoconductive drum 41e, 41k across the transfer belt 32. The positions at which the transfer belt 32 is sandwiched between one of photoconductive drums 41e, 41k and the primary transfer roller 43e, 43k are referred to as the primary transfer positions. At the primary transfer position, the toner image on the photoconductive drum is transferred onto the transfer belt 32. The cleaner 45e, 45k cleans toner left on the surface of the photoconductive drum after the respective toner image is transferred to the transfer belt 32.

The toner images transferred onto the transfer belt 32 by the image forming sections 30E, 30K are transferred onto a sheet at the secondary transfer position as the transfer belt 32 moves. The combined toner image is transferred to a sheet at the secondary transfer position, which is located where the driving roller 33 and the secondary transfer roller 35 face each other, is then supplied to the fixing device 14.

The fixing device 14 includes the heating unit (heater) 50, the pressure roller 51, the fixing belt 52.

The heating unit 50 heats the fixing belt 52. The heating unit 50 is arranged to be adjacent to the fixing belt 52. The heating unit 50 includes a ferrite core and a coil. A high frequency current flows through the coil, thereby generating heat for heating the fixing belt 52.

The fixing belt 52 is supported in a rotatable manner along the sheet conveyance direction. A width of the fixing belt 52 in a direction (e.g., a sheet width direction corresponding to the X-direction in FIG. 2) that is orthogonal to the sheet conveyance direction (e.g., a sheet length direction) is greater than a width (dimension in an X axis direction) of the sheets being conveyed. For example, the fixing belt 52 is made of a polyimide sleeve. A metal layer, such as a nickel layer and/or a copper layer, is formed at the outer side of the fixing belt 52. A pressure pad made of heat resistant resin is arranged at a position corresponding to the pressure roller 51 at the inner side of the fixing belt 52.

The pressure roller 51 includes a core made of metal extending longitudinally in the direction orthogonal to the sheet conveyance direction, and a rubber layer laminated on the outer peripheral surface of the core. The length of the pressure roller 51 in its longitudinal direction is approximately equal to the width (in X-direction) of the fixing belt 52. The pressure roller 51 is biased by an elastic member to press in a direction towards the fixing belt 52. The pressure roller 51 is pressed against the pressure pad which is arranged at the inner side of the fixing belt 52 across the fixing belt 52. With these configurations, the surface of the pressure roller 51 and the surface of the fixing belt 52 are in close contact with each other. The part where the pressure roller 51 and the fixing belt 52 are in close contact with each other becomes a nip part through which the sheet passes during the fixing process.

The fixing belt 52 is heated by the heating unit 50. The fixing belt 52 rotates with the rotation of the pressure roller 51. When current flows to the coil of the heating unit 50, according to temperature setting of the system controller 4 and the pressure roller 51 rotates with the fixing belt 52, the pressure roller 51 and the fixing belt 52 will be heated while rotating until a temperature set by the system controller 5 is reached.

Figure 3:
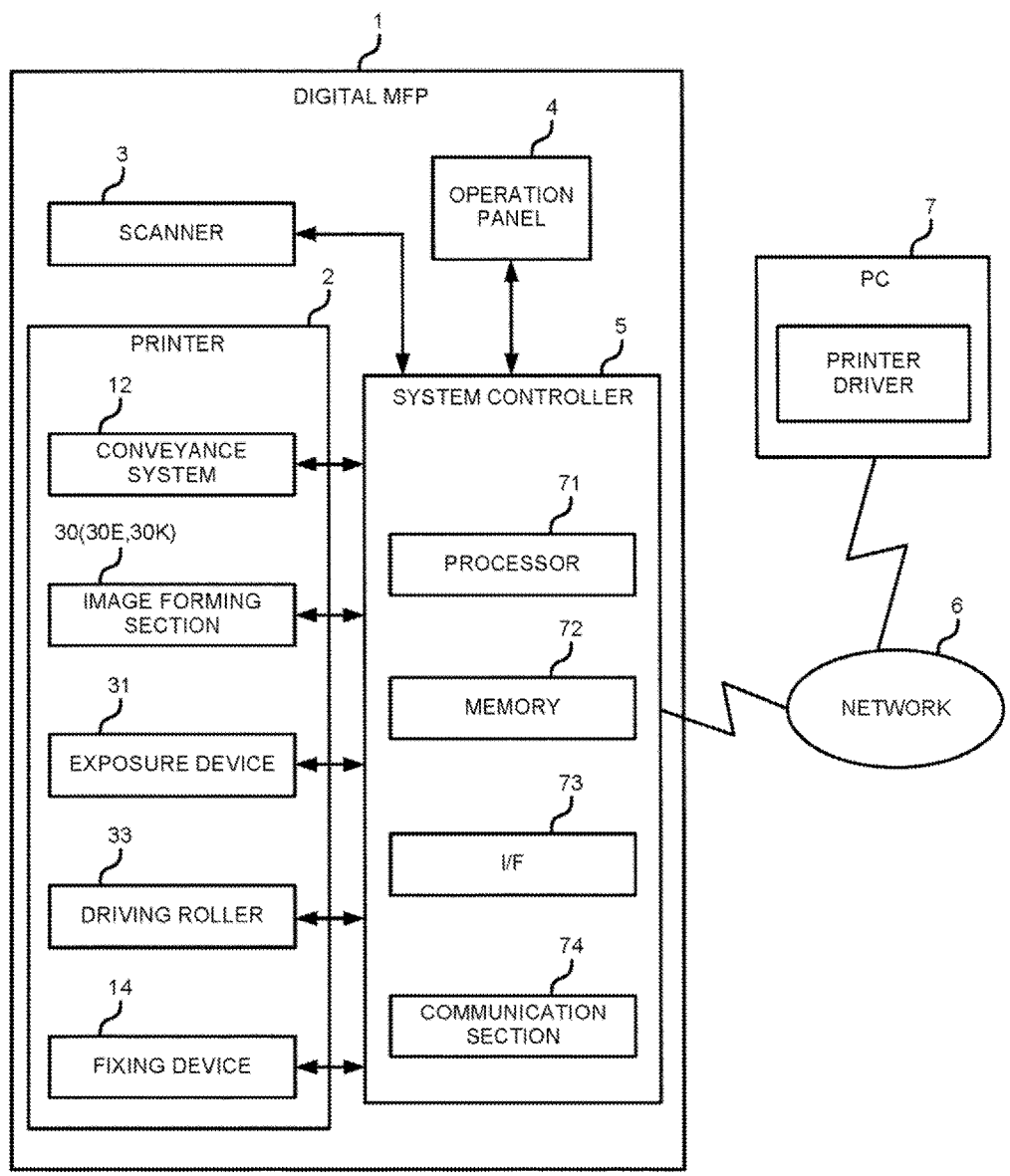
FIG. 3 is a block diagram illustrating a control system of the image forming apparatus according to the embodiment.

FIG. 3 is a block diagram illustrating an example of the configuration of a control system in the MFP 1.

In the MFP 1, the system controller 5 is connected to various the sections such as the printer 2, the scanner 3, the operation panel 4 and the like via an interface. The system controller 5 controls the various sections such as the printer 2, the scanner 3, the operation panel 4.

For example, the system controller 5 controls the operation of the scanner 3 to acquire an image of a document read by the scanner 3.

Further, the system controller 5 controls each part of the operation panel 4 such as the display, the touch panel, and buttons. For example, the operation panel 4 displays information, a GUI (Graphical User Interface,) and the like on the display under the control of the system controller 5. The operation panel 4 supplies information input by the user through the GUI or buttons to the system controller 5.

In the example configuration shown in FIG. 3, the system controller 5 is also connected to various other sections including the conveyance system 12, the image forming section 30 (30E, 30K), the exposure device 31, the fixing device 14, and the like of the printer 2. As a result, the system controller 5 controls the operation of the printer 2 by controlling these various sections of the printer 2.

The system controller 5 controls conveyance of the sheet by controlling a driving motor for driving conveyance rollers in the conveyance system 12. For example, the registration roller 23 in the conveyance system 12 is driven by a registration motor controlled by the system controller 5. The system controller 5 sends a sheet to the secondary transfer position beyond the registration roller 23 by turning on the registration motor.

The system controller 5 performs control to form a toner image with the decolorable toner by controlling the operation of each sub-section in the image forming section 30E. The system controller 5 performs control to form a toner image with the non-decolorable toner by controlling the operation of each sub-section in the image forming section 30K. For example, the system controller 5 controls the formation of latent images on the photoconductive drums 41e and 41k by controlling the exposure device 31 according to a printed image data. The system controller 5 performs control as necessary to print an image on a sheet using one or both of the decolorable toner and the non-decolorable toner through control of the image forming sections 30E and 30K and the exposure device 31.

The system controller 5 controls the operation of the transfer belt 32, which is rotated by the driving roller 33, by controlling a driving motor for driving the driving roller 33. The system controller 5 rotates the transfer belt 32 to transfer the toner images formed with the decolorable toner and the non-decolorable toner to the transfer belt 32. Furthermore, the system controller 5 rotates the transfer belt 32 to transfer the toner images from the transfer belt to a sheet at the secondary transfer position.

The system controller 5 controls the fixing process performed by the fixing device 14. For example, the system controller 5 controls the operations of the pressure roller 51 and the fixing belt 52 by controlling the rotation of the fixing motor. The system controller 5 monitors the temperature of the fixing belt 52 with a temperature sensor to control the temperature of the fixing belt 52 by controlling the heating unit 50.

As shown in FIG. 3, the system controller 5 includes a processor 71, a memory 72, an interface (I/F) 73, and a communication section 74.

The processor 71 is, for example, a CPU (Central Processing Unit). The processor 71 realizes various functions by executing programs stored in the memory 72. The processor 71 is connected to various sections of the printer 2, the scanner 3 and the operation panel 4 and the like via an internal interface 73. The processor 71 collectively controls each section by executing a program.

The memory 72 includes a program memory, a work memory, a data memory, and the like. The program memory stores the program to be executed by the processor 71. The program memory is a nonvolatile memory such as a ROM (Read Only Memory), a NVM (Non-Volatile Memory), a HDD (Hard Disk Drive), a SSD (Solid State Drive), etc. The work memory is used for storing work data and the like. The work memory is a rewritable memory such as a RAM (Random Access Memory), for example. The data memory holds various data. The data memory is a rewritable non-volatile memory such as the HDD, the SSD, etc., for example.

The interface 73 is the interface for connecting to various sections in the MFP 1. For example, the processor 71 of the system controller 5 is connected to each section via the interface 73.

The communication section 74 is used for communicating with an external device such as the PC 7. For example, the communication section 74 is a network interface, such as a LAN interface, for connecting with the network 6. As a result, the communication section 74 can communicate with the PC 7 via the network 6. The communication section 74 may provide wireless communication. The communication section 74 may be a serial interface which serially communicates with an external device.

The PC 7 is an external device which can communicate with the MFP 1 via the network 6 and the communication section 74. The PC 7 is a computer having a processor, a memory, and a communication interface. The PC 7 realizes various functions by the processor executing a program stored in the memory. In the present embodiment, it is assumed that a printer driver, which is a program for requesting the MFP 1 to perform printing operations, is installed in the PC 7 as a program.

The PC 7 can request the MFP 1 to perform a printing operation by the processor running the printer driver. In other words, the PC 7 can send a printing instruction and a print setting when in a management printing mode, described further later, to the MFP 1 by utilizing aspects of the printer driver. In general, the PC 7 may be any device capable of executing the printer driver so as to request the MFP 1 to perform a printing operation. For example, in this context, the PC 7 may be any information processing device such as a mobile phone, a smartphone or a tablet computer.

Next, the printing process by the MFP 1 configured as described above is schematically described.

The MFP 1 executes a printing process by the system controller 5 executing a program previously installed. The MFP 1 prints an image on the sheet using either the decolorable toner or the non-decolorable toner in a normal printing mode. In other words, in the present embodiment, in the normal printing mode, it is assumed that either a visible image formed with the decolorable toner or with the non-decolorable toner is being printed on the sheet.

When printing an image using the decolorable toner in the normal printing mode, the system controller 5 controls the exposure device 31 and the image forming section 30E according to supplied image data for the image to be printed with the decolorable toner. As a result, the toner image formed with the decolorable toner is formed on the photoconductive drum 41e and subsequently transferred onto the transfer belt 32. The system controller 5 conveys a sheet P to the secondary transfer position between transfer belt 32 and the secondary transfer roller 35 in accordance with a timing at which the toner image on the transfer belt 32 moves. The toner image formed with the decolorable toner is then transferred from the transfer belt 32 onto the sheet.

The sheet P is then subjected to the fixing process at the fixing device 14. When fixing an image formed with decolorable toner onto the sheet P, the system controller 5 uses the heating unit 50 to heat the fixing belt 52 to the fixing temperature of the decolorable toner. The fixing temperature of the decolorable toner is lower than the decoloring temperature of the decolorable toner and is typically lower than the fixing temperature used for the non-decolorable toner in normal processing.

The system controller 5 sends the sheet P to a nip part (nip) between the pressure roller 51 and the fixing belt 52 that has been heated to the fixing temperature for the decolorable toner. The sheet P is heated and pressurized as it passes through the nip part as the fixing position. As a result, the toner image formed with the decolorable toner is fixed on the sheet P without having been decolored at the fixing device 14. The sheet P passing through the fixing device 14 is discharged to the sheet discharge section by the sheet discharge roller 24.

When printing an image using the non-decolorable toner in a normal printing mode, the system controller 5 controls the exposure device 31 and the image forming section 30K according to the image data of the image to be printed on the sheet with the non-decolorable toner. As a result, a toner image formed with the non-decolorable toner is formed on the photoconductive drum 41k by the system controller 5. The toner image formed on the photoconductive drum 41k is transferred onto the transfer belt 32. The system controller 5 conveys the sheet P to the secondary transfer position in accordance with the timing at which the toner image on the transfer belt 32 moves. As a result, the toner image formed with the non-decolorable toner is transferred onto the sheet P.

The sheet P is subsequently subjected to the fixing process at the fixing device 14. When fixing an image formed with the non-decolorable toner, the system controller 5 heats the fixing belt 52 to the fixing temperature for the non-decolorable toner). The system controller 5 sends the sheet P to the nip part between the pressure roller 51 and the fixing belt 52 that has been heated to the fixing temperature for the non-decolorable toner. The sheet P is heated at this fixing temperature as it passes through the nip part.

The MFP 1 has a management printing mode in addition to the normal printing mode described above. The management printing mode is a mode in which identification information, such as a barcode, for document management purposes or the like is printed on the sheet along with the normal page image. Specifically, in the management printing mode, the identification information and the normal page image are printed on the same sheet. The identification information is used for managing the printed document (or an image of the printed document). The identification information is printed as a barcode, for example. In the following, it is assumed that a barcode is printed as the identification information though other types of identification information can be used according to the present embodiment.

In the management printing mode, it can be selected whether the barcode is to be printed in an invisible state by using decolorable toner or in a visible state using non-decolorable toner. For example, in the management printing mode, it can be assumed that the user can select whether to print the barcode in a decolored state (invisible state) or not.

If it is selected to print the barcode in the visible state, the MFP 1 prints document and the barcode with the non-decolorable toner. In this case, the MFP 1 transfers non-decolorable toner onto the sheet and performs the fixing process at the fixing temperature appropriate for the non-decolorable toner. As a result, the document image and the barcode are printed on the sheet in a visible state.

If it is selected to print the barcode in a decolored state, the MFP 1 forms the barcode with decolorable toner and transfers it onto the sheet. Along with this, the MFP 1 also forms a document image (other than the identification information) with non-decolorable toner and transfers it onto the sheet. As a result, the barcode portion of the document image is formed with decolorable toner and the document image (other than the barcode) formed with non-decolorable toner and all portions of the document image are transferred onto the sheet. The MFP 1 performs the fixing process on the sheet on which the toner image has been formed with both the decolorable toner and the non-decolorable toner at the fixing temperature for the non-decolorable toner. As a result, the portion of the toner image formed with the decolorable toner and the portion of the toner image formed with the non-decolorable toner are printed on the sheet in such a manner that the barcode (formed by the decolorable toner) will be decolored, and thus substantially invisible, and the image formed with the non-decolorable toner will be visible.

The decolorable toner forms a substantially invisible image when heated/fixed at a temperature above its decoloring temperature by, for example, becoming transparent or changing to the same color as a background color of the sheet. In other words, the decolorable toner fixed on the sheet forms an invisible image when heated at a high temperature (above the decoloring temperature), but material constituting the decolorable toner remains on the sheet even though not readily apparent to the human eye. For example, the resin of the decolorable toner becomes invisible to human eyes, but can still be read by a scanner due to a difference in reflectance or the like between the decolored toner material and the underlying sheet.

In the present embodiment, it is assumed that the identification information, such as a barcode (also referred to as a stealth barcode) printed with decolorable toner in a decolored state can be read by a scanner. As a result, the identification information, which is otherwise invisible, can be read by a scanner, thereby permitting management of such documents based on the identification information invisibly printed thereon.

Figure 4:
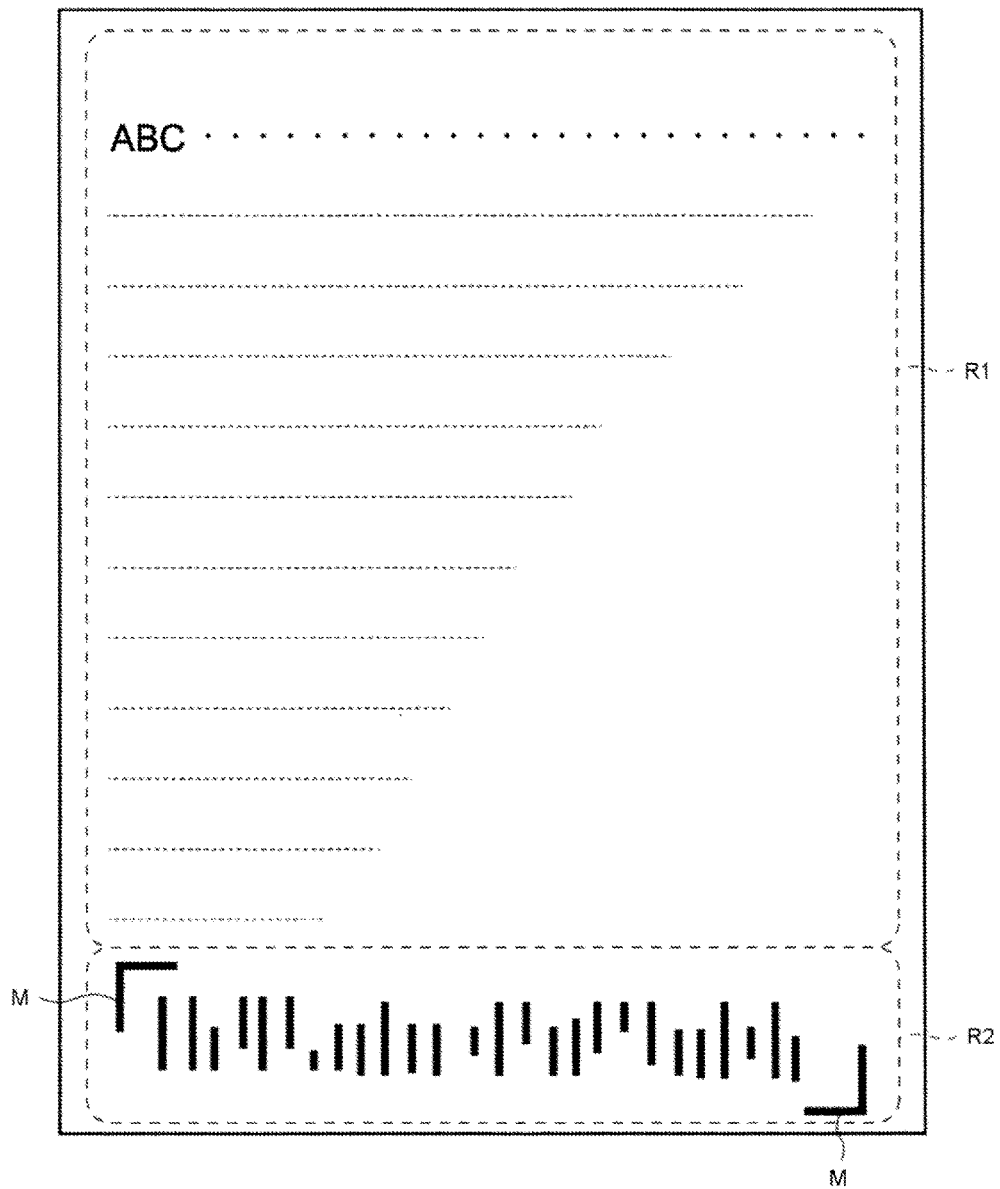
FIG. 4 is a diagram illustrating an example in which the image forming apparatus according to the embodiment prints an image attached with identification information in a management printing mode.

FIG. 4 is a diagram illustrating an example of printed sheet printed in the management printing mode.

In the example shown in FIG. 4, in the management printing mode, a printing area R1 and a printing area R2 are provided on the sheet P. The printing area R1 is where an image on the document to be managed (the printed image) is printed. The printing area R2 is where a barcode (identification information) is printed. Furthermore, in the example shown in FIG. 4, a mark M indicating a printing position of the barcode is printed in the printing area R2.

Specifically, in the management printing mode, the MFP 1 prints an image on the document with the non-decolorable toner in the printing area R1. The MFP 1 prints the identification information in the printing area R2. In the printing area R2, the identification information can be printed with either the decolorable toner or the non-decolorable toner. A user can select whether to print the identification information with the decolorable toner or the non-decolorable toner.

For example, a user selection to decolor the identification information can be input via the operation section of the operation panel 4. In the case of requesting printing in the management printing mode from the PC 7, the user may instruct whether to decolor the identification information via the PC 7 in which the printer driver is installed. In this case, the MFP 1 receives information indicating whether to decolor the identification information or not from the PC 7 via the communication section 74.

Furthermore, the MFP 1 prints a mark M indicating a printing position of the identification information with the non-decolorable toner. In the example shown in FIG. 4, the mark M is printed so as to indicate the printing position of the identification information in the printing area R2. The user may select whether or not to print the mark M. The mark M may be printed if a barcode is to be printed with the decolorable toner in a decolored state (invisible state). In the case of printing a barcode with the decolorable toner in the decolored state, the user may select whether to print the mark M.

The mark M is not limited to a particular symbol shown in FIG. 4 and, in general, any symbol may be adopted as long as it can indicate the printing position of the identification information. For example, the mark M may be an underline attached to the identification information (barcode) or a symbol mark indicating a printing start position of the identification information (barcode).

FIG. 5 is a flowchart for depicting a flow of the printing process in the management printing mode of the digital MFP 1.

The system controller 5 receives a printing request in the management printing mode from the operation panel 4 or the PC 7.

For example, the user designates the management printing mode with the operation panel 4. In this case, the user sets various printing settings in the management printing mode with the operation panel 4. For example, the user designates an image to be printed and the identification information and instructs the printing by selecting whether to print the barcode with the decolorable toner or with the non-decolorable toner. If it is instructed to print the barcode in the decolored state (printing of a stealth barcode), the user further instructs whether or not to print a mark M with the non-decolorable toner. The above information input via the operation panel 4 is transmitted to the system controller 5.

If it is instructed to perform printing in the management printing mode with the PC 7, the user starts the printer driver in the PC 7 and selects the printing setting in the management printing mode. In the PC 7, the user designates an acquisition method for the image and the barcode to be printed, and meanwhile selects whether to print the barcode with the decolorable toner or with the non-decolorable toner. Furthermore, if it is instructed to print the barcode with the decolorable toner, the user selects whether or not to print a mark M with the non-decolorable toner in the PC 7. The PC 7 transmits the information instructed by the user to the MFP 1 as a printing request.

If a printing instruction in the management printing mode is input through the operation panel 4 (Yes in ACT 11) or if the printing request in the management printing mode is received from the PC 7 (Yes in ACT 12), the system controller 5 starts the printing process in the management printing mode. Upon starting the printing process in the management printing mode, the system controller 5 acquires the image data, such as the image of a document, and the identification information.

If the printing instruction in the management printing mode is input through the operation panel 4, the system controller 5 acquires the printed image designated by the user (ACT 13). The printed image may be an image of a document read by the scanner 3, an image input from an external device, or an image stored in a memory. For example, if an image of a document set in the scanner 3 is to be printed image, the system controller 5 reads the document with the scanner 3.

If the printing request in the management printing mode is received from the PC 7, the system controller 5 acquires the image data transmitted from the PC 7 as the printed image (ACT 13).

The system controller 5 acquires the identification information to be printed as a barcode on the sheet in conjunction with the printed image (ACT 14). The identification information may be designated by the user or may be issued by the system controller 5. The identification information may be acquired from an external device such as a management server via the network 6.

If the printed image and identification information are acquired, the system controller 5 determines whether to print the barcode with the decolorable toner in the decolored state or with the non-decolorable toner (ACT 15). Whether to print the barcode with the decolorable toner in the decolored state or with the non-decolorable toner can be selected every time the printing is performed in the management printing mode. For example, if the user instructs printing of the barcode in the decolored state with the operation panel 4, the system controller 5 determines to print the barcode in the decolored state (Yes in ACT 15). If it is selected to print the barcode with the decolorable toner in the PC 7, the system controller 5 determines to print the barcode with the decolorable toner in response to the request received from the PC 7 (Yes in ACT 15).

If it is determined that the barcode is printed with the decolorable toner in the decolored state (Yes in ACT 15), the system controller 5 generates the image data of the barcode formed with the decolorable toner (ACT 16). In the management printing mode, the image formed with the decolorable toner is an image to be decolored in the fixing process and is an image (e.g., barcode) indicating the identification information. Therefore, the system controller 5 encodes the acquired identification information into a barcode or the like, and converts the created barcode into the image data for printing.

In the case of printing the barcode with the decolorable toner, the system controller 5 determines whether to print the mark M indicating the printing position of the barcode (ACT 17). It is assumed that the user can select whether to print the mark M indicating the printing position of the barcode. For example, if the user selects the printing of the mark M with the operation panel 4, the system controller 5 determines to print the mark M with the non-decolorable toner (Yes in ACT 17). If it is selected to print the mark M on the PC 7, the system controller 5 determines to print the mark M in with the non-decolorable toner in response to the request received from the PC 7 (Yes in ACT 17).

If it is determined to print the mark M (Yes in ACT 17), the system controller 5 generates the image data for forming the printed image along with the image of the mark M with the non-decolorable toner (ACT 18). In other words, if the mark M is printed, the system controller 5 prints the printed image in the printing area R1 and also creates image data for printing to print the mark M in the printing area R2.

If it is determined that the mark M is not to be printed (No in ACT 17), the system controller 5 generates the image data just for forming the printed image with the non-decolorable toner (ACT 19). Specifically, if the mark M is not printed, the system controller 5 creates the image data for printing in the printing area R1.

If the image data for printing is created with both the decolorable toner and the non-decolorable toner, the system controller 5 forms toner images with the image forming sections 30E and 30K, respectively. Specifically, the system controller 5 controls the image forming section 30E and the exposure device 31 to form the toner image with the decolorable toner based on the portion of image data corresponding to the decolorable image (ACT 20). As a result, the image of the barcode is formed on the photoconductive drum 41*e* of the image forming section 30E.

The system controller 5 controls the image forming section 30K and the exposure device 31 to form the toner image with the non-decolorable toner based on the portion of the image data corresponding to the non-decolorable toner (ACT 21). Thus, if the mark M is to be printed formed with the non-decolorable toner an image corresponding to Mark M is formed on the photoconductive drum 41*k* of the image forming section 30K.

The system controller 5 transfers the toner image formed (with the decolorable toner) by the image forming section 30E and the toner image formed (with the non-decolorable toner) by the image forming section 30K onto the transfer belt 32 in an overlapped manner. The system controller 5 next transfers the toner image from the transfer belt 32 onto a sheet (ACT 22). As a result, the toner image (e.g., barcode image) formed with the decolorable toner and the toner image formed with the non-decolorable toner are transferred onto the sheet.

Furthermore, the system controller 5 controls the temperature of the fixing belt 52 to be the fixing temperature for the non-decolorable toner and performs the fixing process on the sheet onto which the toner image formed with the decolorable toner and the toner image formed with the non-decolorable toner were transferred (ACT 23). In the fixing process at the fixing temperature for the non-decolorable toner, although the image formed with the decolorable toner and the image formed with the non-decolorable toner are simultaneously fixed on the sheet, the printed/fixed image formed with the decolorable toner will be decolored (invisible). As a result, the barcode is decolored, while the image other than the barcode is not decolored. The sheet is discharged to the discharge section (ACT 24) and the printing process is completed.

If the barcode is not printed in a decolored state, the system controller 5 generates the image data for forming the printed image with the non-decolorable toner (ACT 25), and forms the toner image using the non-decolorable toner with the image forming section 30K (ACT 26). In this case, the system controller 5 transfers the toner image formed with the non-decolorable toner onto the sheet (ACT 22), and performs the fixing process at the fixing temperature for the non-decolorable toner (ACT 23) and then discharges the sheet (ACT 24).

As described above, the image forming apparatus according to an embodiment can select whether to print the barcode with decolorable toner in an invisible state or with the non-decolorable toner. When it is selected to print the barcode with the non-decolorable toner, the image forming apparatus prints the barcode with the non-decolorable toner. In this case, the barcode printed with the non-decolorable toner will be visible to the user. When it is selected to print the barcode with the decolorable toner in the invisible state, the image forming apparatus still performs the fixing process at the fixing temperature used for the non-decolorable toner. In this case, the barcode printed with the decolorable toner will be fixed on the sheet in a decolored state, and will be printed on the sheet in a state in which it is substantially invisible or imperceptible to the unaided user.

The user can perform the printing by selecting whether the identification information is to be printed on the sheet as visible or invisible. However, even in when it has been selected to print the identification information in the invisible state, the document printing process can be executed in a single printing step, which is similar to when the identification information is printed in the visible state.

The barcode formed with the decolorable toner is decolored in the fixing process performed at the fixing temperature for the non-decolorable toner, which is at least equal to the temperature at which the decolorable toner becomes decolored, but the resin forming the decolorable toner remains (though lacking in color) on the sheet or other medium being printed. This resin cannot be seen by unaided human eyes, but can still be read by the scanner due to a difference in reflectance with the sheet or other medium on which it has been printed. For this reason, the barcode formed with the decolored decolorable toner can be used as identification information that cannot be easily perceived by human eyes.

Therefore, the user can select whether the identification information to be printed on the document will be visible or invisible. Further, by printing the identification information as invisible to the naked eye, it is possible to prevent the identification information from being improperly read or copied because it cannot be easily perceived with the naked eye unlike when printed with non-decolorable toner. By printing the identification information in the invisible state for the naked eye, it is also possible to eliminate the visual imposition of the identification information on the printed design/image when printing the on a medium, such as an outer box for a retail product or the like. That is, the invisible identification information does not need to hinder or limit the placement of other images on the medium.

The embodiment described above is not limited to being implemented in a MFP 1 as described above. For example, a printer comprising the image forming section 30K and the image forming section 30E was described. The present disclosure is not limited thereto, and an image forming apparatus of an embodiment may have a plurality of the image forming sections for forming a toner image using different non-decolorable toners.

For example, the MFP 1 may include five image forming sections, one of which uses decolorable toner to form an image, and the other four using non-decolorable toners of different colors to form color images. In this case, the MFP 1 may be a color laser printer capable of performing color printing with the non-decolorable toners and monochrome printing with the decolorable toner.

In an embodiment described above, a printer 2 in the MFP 1 having a transfer belt 32 as an intermediate transfer member was described. The present disclosure is not limited thereto. The printer 2 may include a transfer drum or the like as a transfer body instead of the transfer belt. In an embodiment, a configuration in which the fixing device 14 includes a fixing belt 52 as a fixing member was described. The present disclosure is not limited thereto, and the fixing device 14 used in the printer 2 according to an embodiment may include a fixing roller or the like instead of a fixing belt 52.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image forming apparatus, comprising:
   a controller configured to control a image forming process to print identification information along with a first image on a medium according to an operation selection;
   a first image forming section configured to form images on the medium using a non-decolorable image forming material;
   a second image forming section configured to form images on the medium using a decolorable image forming material; and
   a fixing device configured to perform a fixing operation to fix images to the medium at a first fixing temperature that is at or above a decoloring temperature of the decolorable image forming material, wherein
   when the operation selection indicates the identification information printed on the medium is to be visible, the controller controls the first image forming section to form the first image and the identification information on the medium and the fixing device to fix the images to the medium at the first fixing temperature, and
   when the operation selection indicates the identification information printed on the medium is to be invisible, the controller controls the first image forming section to form the first image on the medium, the second image forming section to form the identification information on the medium, and the fixing device to fix the images to the medium at the first fixing temperature.

2. The image forming apparatus according to claim 1, further comprising:
   an input panel configured to permit a user to make the operation selection.

3. The image forming apparatus according to claim 1, further comprising:
   a communication interface configured to connect to an external device, wherein
   the operation selection is received from the external device via the communication interface.

4. The image forming apparatus according to claim 1, wherein the operation selection indicates whether or not a mark indicating a printing position of the identification information on the medium is to be printed on the medium by the first image forming apparatus when the identification information is to be formed on the medium with the decolorable image forming material.

5. The image forming apparatus according to claim 1, wherein the identification information is a barcode.

6. The image forming apparatus according to claim 1, wherein the decolorable image forming material comprises a leuco dye.

7. The image forming apparatus according to claim 1, wherein the non-decolorable image forming material is black toner.

8. The image forming apparatus according to claim 1, wherein the decolorable image forming material is blue in color in a non-decolored state.

9. The image forming apparatus according to claim 1, further comprising:
   a scanner configured to read identification information from the medium when the identification has been printed on the medium to be invisible.

10. The image forming apparatus according to claim 1, wherein the medium is a sheet of paper.

11. The image forming apparatus according to claim 1, wherein the first fixing temperature is a normal fixing temperature for the non-decolorable image forming material.

12. The image forming apparatus according to claim 1, wherein the fixing device is further configured to perform the fixing operation at a second temperature that is lower than the decoloring temperature.

13. A multi-functional peripheral apparatus, comprising:
a controller configured to control a image forming process to print identification information along with a first image on a medium according to an operation selection; and
a printer connected to the controller and including:
a first image forming station configured to form toner images on the medium using a non-decolorable toner;
a second image forming station configured to form toner images on the medium using a decolorable toner; and
a fixing device configured to fix the toner images to the medium at a fixing temperature that is controllable by the controller to be a first temperature that is at or above a decoloring temperature of the decolorable toner or a second temperature that is lower than the decoloring temperature, wherein
when the operation selection indicates the identification information printed on the medium is to be visible, the controller controls:
the first image forming station to form the first image and the identification information on the medium, and
the fixing device to fix the images to the medium at the first temperature; and
when the operation selection indicates the identification information printed on the medium is to be invisible, the controller controls:
the first image forming section to form the first image on the medium,
the second image forming section to form the identification information on the medium, and
the fixing device to fix the images to the medium at the first temperature.

14. The multi-functional peripheral apparatus according to claim 13, further comprising:
a scanner configured to read identification information from the medium when the identification has been printed on the medium to be invisible.

15. The multi-functional peripheral apparatus according to claim 13, wherein the medium is a sheet of paper.

16. The multi-functional peripheral according to claim 13, wherein the first temperature is a normal fixing temperature for the non-decolorable toner.

17. A method of printing identification information on a document, comprising:
acquiring identification information to print on a document; and
receiving an operation selection indicating whether the identification information is to be visible or invisible on the document, wherein
when the operation selection indicates the identification information printed on the document is to be visible, forming a first image and the identification information on the document using non-decolorable toner and fixing the non-decolorable toner to the document at a first temperature in a fixing device, and
when the operation selection indicates the identification information printed on the document is to be invisible, forming the first image on the document with the non-decolorable toner, forming the identification information on the document with decolorable toner, and fixing the first image and the identification information to the document at the first temperature in the fixing device, the first temperature being greater than a decoloring temperature of the decolorable toner.

18. The method of claim 17, wherein the decolorable toner comprises a leuco dye.

19. The method of claim 17, wherein the operation selection is received via a network communication interface from a personal computing device.

20. The method of claim 17, wherein the identification information is a barcode.

* * * * *